United States Patent [19]

Jones

[11] 3,886,489

[45] May 27, 1975

[54] ULTRASONIC IMAGE CONVERTER AND SYSTEM

[75] Inventor: Charles H. Jones, Murrysville, Pa.

[73] Assignee: Westinghouse Electric Corp., Pittsburgh, Pa.

[22] Filed: Feb. 25, 1974

[21] Appl. No.: 445,525

[52] U.S. Cl............. 340/5 MP; 340/10; 343/5 CD
[51] Int. Cl.............................................. G01s 9/68
[58] Field of Search.......... 340/5 MP, 5 H, 8 R, 10; 343/5 CD, 17; 73/67.5 H, 67.6, 67.7, 67.8

[56] References Cited
UNITED STATES PATENTS

| | | | |
|---|---|---|---|
| 2,855,531 | 10/1958 | Nicoll | 340/5 MP |
| 3,134,975 | 5/1964 | Goodman | 343/5 CD |
| 3,711,823 | 1/1973 | Green | 73/67.5 H |
| 3,736,552 | 5/1973 | Sessler et al. | 340/5 MP |
| 3,780,572 | 12/1973 | Rocha | 73/67.5 R |

*Primary Examiner*—Richard A. Farley
*Attorney, Agent, or Firm*—D. Schron

[57] ABSTRACT

The present invention provides a system for sonifying an area such as the floor of the ocean and converting reflected signals to optical images. The system includes a sonic pulse transmitter and a lens for focusing reflected energy to the surface of an image converter. The image converter of the invention comprises an integrated solid-state assembly of N piezoelectric transducers electrically connected to N associated amplifiers which are in electrical contact with N associated electroluminescent cells. The image formed by the luminescent cells is focused to a television camera tube for real time display on a television monitor.

10 Claims, 8 Drawing Figures

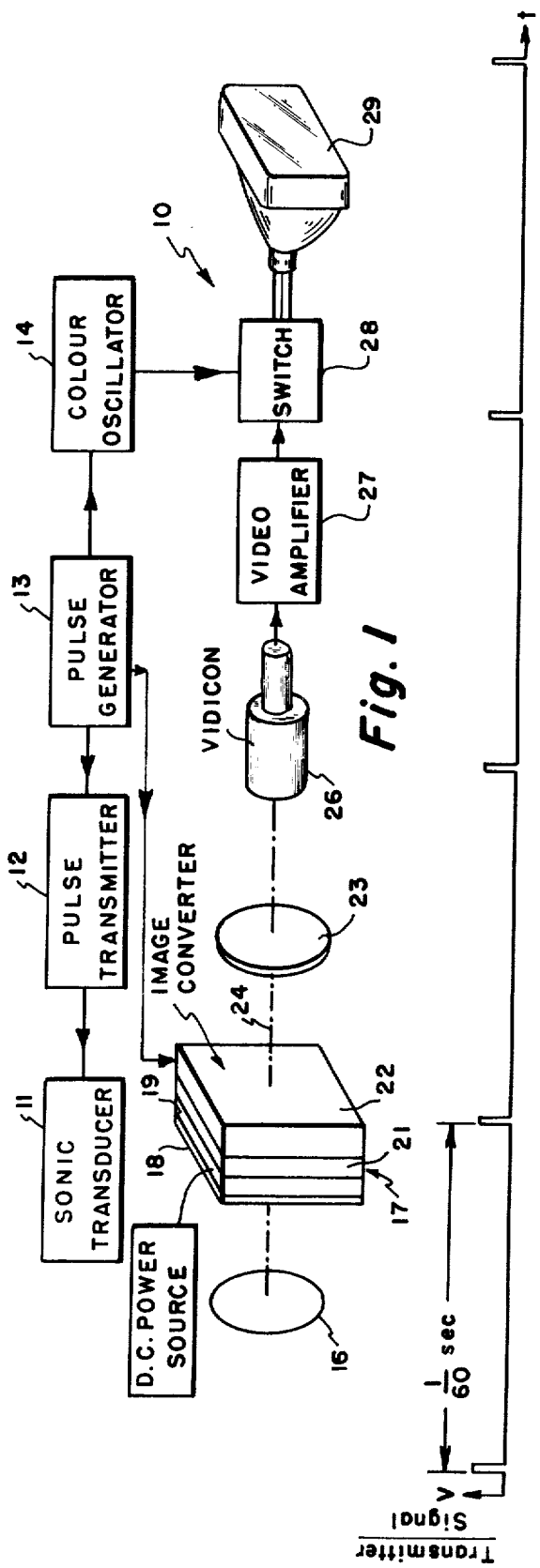
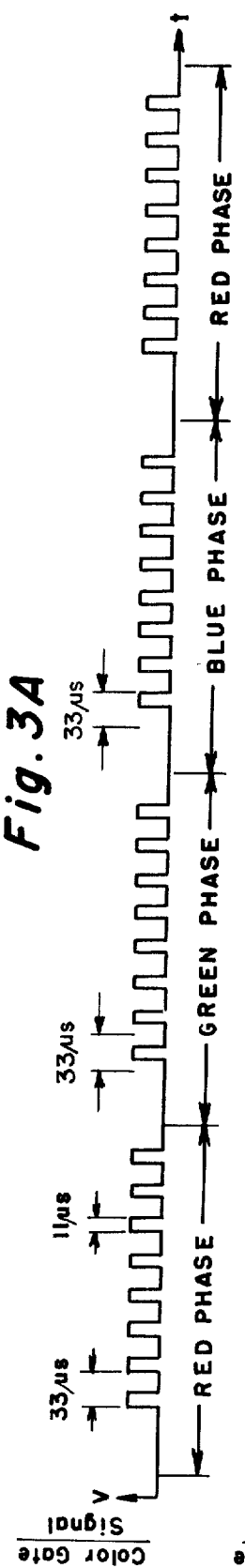
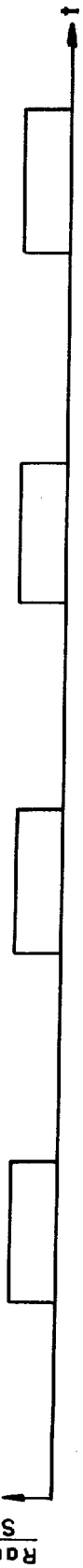

ULTRASONIC IMAGE CONVERTER AND SYSTEM

FIELD OF THE INVENTION

The present invention relates to a system for sonifying an area with ultrasonic energy and converting reflecting energy patterns to optical image patterns, and, in particular, to a high resolution system utilizing an integrated solid-state ultrasonic image converter.

BACKGROUND OF THE INVENTION

For a number of years, attempts have been made to develop an ultrasonic image converter of high resolution. These attempts, for the most part, have not been successful because of the complexity of the electrical circuits required, primarily the large number of interconnections, and/or because of the low sensitivity of the system. While numerous sonic image converters have been developed, and many of those developed found useful, they have been generally of limited application. Illustrative of a number of these image converters and/or systems employing image converters are U.S. Pat. Nos. 3,030,540; 3,475,551; 2,700,895, and 3,481,425.

In many of these systems switching from element to element of a piezoelectric plate is required by light beam scanning of a photoconductive surface or by scanning a matrix of photodiodes that is electrically connected to the piezoelectric plate. These systems have an inherent disadvantage in that at any point in time only one element in an array of elements receiving input energy is producing an output while the others are lost as to that time reference.

In U.S. Pat. No. 3,400,363, on the other hand, a method is disclosed for simultaneously obtaining an output from an entire array of elements. In that method, coherent sonic energy is transmitted from point sonic sources arranged in an areal array and detected by transducers arranged in an areal array. A corresponding array of light emitters such as glow lamps is connected to the detector transducers to provide a light pattern which is the same as the sonic detector pattern. While this system provides an output from all input receiving elements at the same time, high sensitivity cannot be obtained.

The present invention overcomes the inherent disadvantages of prior art image converting systems and provides a high resolution, real time optical image of the sonified area. The present invention provides a system which makes possible a real time view of underwater areas, opaque materials, and the like. Further, the present invention provides a novel integrated solid-state ultrasonic image converter for use in the system.

SUMMARY OF THE INVENTION

Generally, the present invention includes a projecting or transmitting transducer for sonifying an object area with a short pulse of ultrasonic energy having a pulse width selected to provide the desired range resolution. A reflected sonic signal is received from the sonified area preferably through a sonic lens which directs the sonic energy to an ultrasonic image converter. The ultrasonic image converter converts the pattern of reflected ultrasonic energy into a visual luminescent output pattern. The luminescent output pattern on the image converter is focused by means of a lens onto a low light level television tube, such as a Vidicon, which acts as a storage means for integrating the optical output energy of the converter to increase the sensitivity of the system. The output signal of the television tube is displayed on a television monitor to provide a real time visual image pattern of the sonified area.

In a preferred embodiment of the invention, colours are used for range display. For example, three colours such as red, green and blue may be used to differentiate various ranges or, alternatively, a white-gray system may be incorporated for range display.

The ultrasonic image converter of the present invention comprises an array of N piezoelectric transducers and N associated low noise, high gain amplifiers. Preferably, these amplifiers are doped silicon or integrated circuit amplifiers. Each amplifier is in electrical contact with an associated piezoelectric transducer and an associated electroluminescent element of an N-element array. The ultrasonic image converter is preferably bonded together to form an integrated solid-state assembly.

Preferably, the image converter comprises a substrate, such as glass having bonded thereto a layer of electroluminescent material such as phosphor or the like material, e.g., ZaS. Evaporated onto the electroluminescent layer is an array of N spaced apart conductive pads. In electrical contact with each of the pads is an associated amplifier, preferably the N amplifiers are silicon operational amplifiers or integrated circuit amplifiers each of which is used to drive that portion of the electroluminescent layer associated or in contact with a conductive pad. Preferably, the array of amplifiers are fabricated as row units having the same number of amplifiers as there are conductive pads per row. Each amplifier is electrically connected to a source of D.C. power. Since high gain is preferred, each amplifier may optionally comprise a plurality of individual amplifiers connected in series. In contact with each amplifier is a spaced array of N piezoelectric transducers having a protective covering thereover of neoprene or the like.

In operation within the system, therefore, sonic energy is focused onto the face of the ultrasonic image converter to activate selected piezoelectric transducers corresponding to a reflected image pattern. Each of the activated transducers produce an electrical signal proportional to the strength to the sonic image pattern focused thereon. Each of the electrical signals thus produced are amplified by an associated amplifier, and the amplified signal is fed to the associated electrical contact pad. The area of the electroluminescent layer adjacent each contact pad has a signal impressed thereon which provides a light output having an intensity proportional to the sonic energy received by the associated piezoelectric transducer. This light is transmitted through the glass substrate to give a visual image pattern identical to that received on the face of the converter.

To provide adjustment in contrast or a change in the linearity of the visual image produced by the image converter, a television tube such as a Vidicon is positioned along the optical axis of the system having a lens interposed therebetween and on the optical axis. The television tube is connected to a television monitor for displaying the high resolution images produced by the system. A colour oscillator may be used which provides a gated sequential display so that each element of range resolution is displayed in a different colour.

Other advantages of the present invention will become apparent from a perusal of the following detailed

BRIEF DESCRIPTION OF THE DRAWINGS

FIG. 1 is a block diagram of an ultrasonic image converting system according to the present invention for three colour range display;

FIGS. 3a, b, c are graphical representations of the signals used to provide three colour range display in the system of FIG. 1;

PRESENTLY PREFERRED EMBODIMENT

Figure 2:
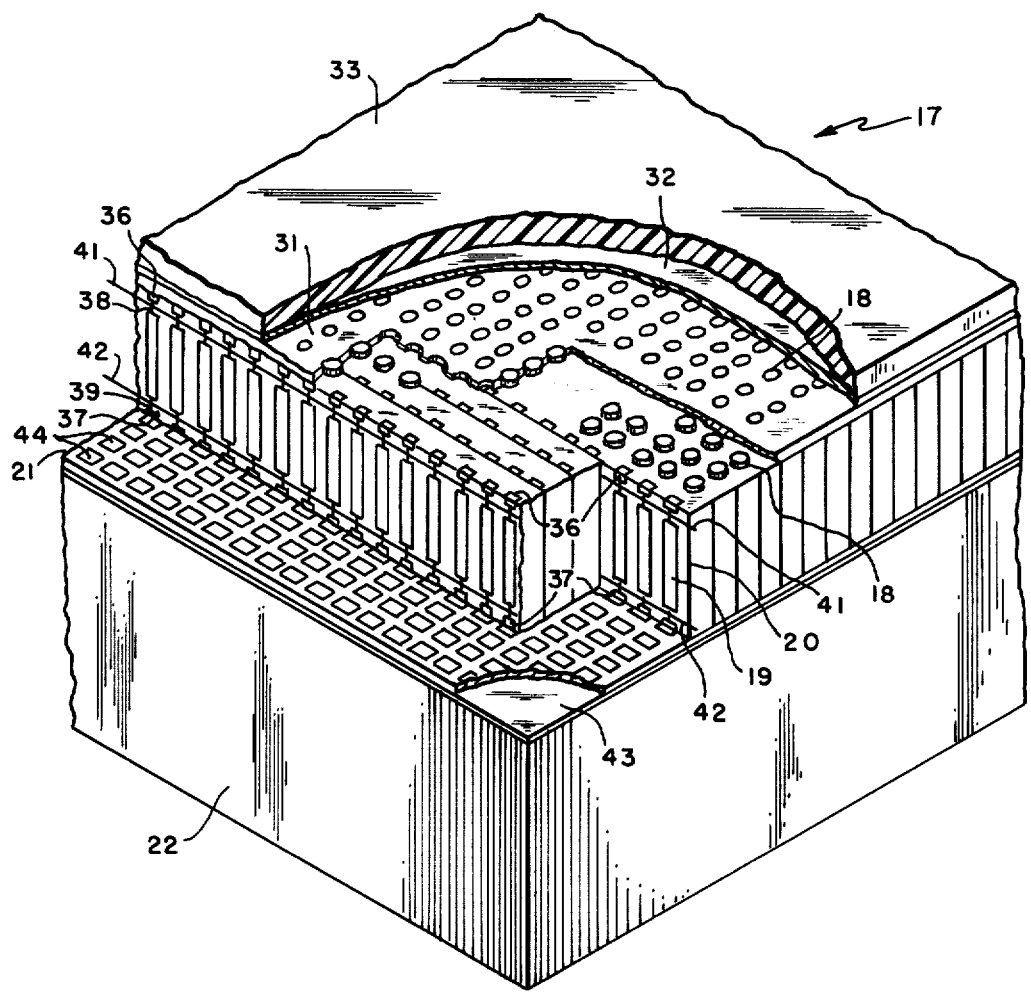
FIG. 2 is a perspective view of an ultrasonic image converter for use in the system of FIG. 1.

With reference to FIG. 1, ultrasonic image converting system 10 for displaying in three colours a visual image of a sonified area includes projecting transducer 11 for pulse transmission in an elastic medium of an ultrasonic signal. For example, the signal may be a 1 MHz pulse having a pulsewidth determined by desired range resolution. For the purposes of the present description, a pulse is transmitted every 1/60 of a second where the elastic medium is water to provide a range of about 42 feet and where 33 $\mu$sec. represents a range resolution of about 1 inch.

Transducer 11 is electrically connected to pulse transmitter 12 which supplies the necessary drive signal to the transducer. Transmitter 12 is controlled by pulse generator 13 which also synchronizes control of colour oscillator 14 and converter 17. Colour oscillator 14 is used to generate three colours: red, green and blue, for example, which, in the presently described embodiment, are sequentially gated for a different colour between each successive pulse transmission, which gating is described in more detail hereinafter.

The receiving portion of system 10 includes a sonic lens 16 for focusing reflected sonic energy from the sonified area to the surface of image converter 17. Piezoelectric array 18 of converter 17 converts the acoustic energy into electrical energy which is amplified by amplifier array 19. The amplified signal is impressed upon electroluminescent layer 21 through an array of electrical contacts to provide a visual image pattern corresponding in intensity with the ultrasonic image pattern.

An optical lens 23 is positioned along optical axis 24 of system 10 to focus the optical output of image converter 17 to a low level television tube 26, preferably a secondary electron conductivity Vidicon. Tube 26 acts as a storage means for the integration of focused energy from all of the electroluminescent elements. Television tube 26 is connected to video amplifier 27 which is controlled by colour switching circuit 28. The output from colour oscillator 14 is directed through switching circuit 28, which sequentially gates a different colour for each transmitted pulse to a colour television monitor 29.

With reference to FIG. 2, image converter 17 comprises an array of N piezoelectric transducers 18. Preferably, the array consists of a matrix 100 × 100 transducers having a diameter of 2$\lambda$, where $\lambda$ is the wavelength of the transmitted sonic wave in the elastic medium. The transducers may be fabricated, for example, from lead metaniobate, and if circular transducers are not utilized a size of 0.1·0.1·0.06 inch is preferred. The transducers used in the present invention preferably have a signal output of about 20 $\mu v$.

Transducers 18 are positioned in a spaced apart relationship by means of perforated sheet 31. Sheet 31 is preferably made from allyl diglycol carbonate or a like material that has ultrasonic absorbing qualities. Each transducer 18 is located in an associated perforated opening, over which is positioned conducting surface 32, for example, an aluminum foil. Conducting surface 32 is positioned to make electrical contact with each transducer 18 in the array for connecting each of the transducers to a common electrical source (not shown). Positioned over and bonded to conducting surface 32 is a protective covering 33 from a thin film of neoprene or a like low loss material. At higher frequencies, e.g., 3 MHz, polystyrene is preferred.

Positioned in electrical contact with transducers 18 is an array of N amplifiers 19. Amplifiers 19 are preferably fabricated as row units 20 of a material such as epoxy or the like insulating material where, for example, each unit 20 of 100 units would comprise a row of 100 amplifiers 19. Each unit 20 is then positioned adjacent another unit to comprise a matrix of 10,000 amplifiers each in contact with an associated piezoelectric transducer 18. Electrical contact pads 36 and 37 are provided for each amplifier 19 on the upper and lower surface, respectively, of each unit 20. Contact pads 36 and 37 are connected to their respective amplifier by wires, e.g., gold wires, 38 and 39, respectively. Amplifiers 19 are electrically connected to a D.C. power source (not shown) by wires 41 and 42 extending the length of each unit 20. Amplifiers 19 may comprise one or a plurality of solid-state (silicon) operational amplifiers or integrated circuits having low noise, a gain of from about 80 to 120 dB, and an average D.C. power of from 50 to 500 watts.

A glass supportive substrate 22 is preferably used with converter 17 to provide the desired strength and to facilitate construction of an integral converter unit. To support the preferred array of 10,000 amplifiers/-transducers, glass substrate 22 has a size of about 12·12·2 and is coated with a conductive coating 43 of tin oxide (NESA) which is transparent to light. Coating 43 is connected to a source of D.C. power (not shown). Deposited over conductive coating 43 is an electroluminescent layer 21, e.g., zinc sulfide, having a thickness of about 10 microns. Evaporated onto electroluminescent layer 21 are N electrical contact elements 44. Each contact element is positioned in a matrix array identical to transducers 18 and amplifiers 19 so that electrical contact between an associated amplifier contact pad 37 is established with an associated element 44. The electrical contact elements 44 in combination with the electroluminescent layer 21 provide an array of electroluminescent cells which are adapted to the desired frequency of the system, e.g., 1 MHz. An evaporated zinc sulfide layer of 10 microns thickness is capable of a voltage of 20 volts and a current of 50 microamps. Peak power in the presently preferred system would be approximately 10 milliwatts with an average power of 1 milliwatt. The efficiency of the electroluminescent cell is approximately 1/10 percent. The output from the substrate screen 22, that is, from the entire panel, is 1 milliwatt.

Figure 4A:
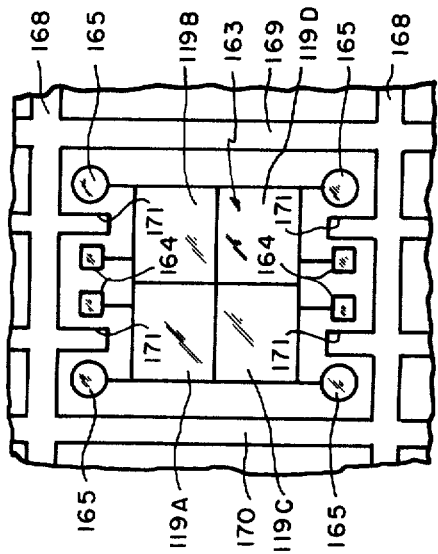
FIGS. 4 and 4a are perspective views of a preferred ultrasonic image converter and an enlarged view of one amplifier group, respectively.
Figure 4:
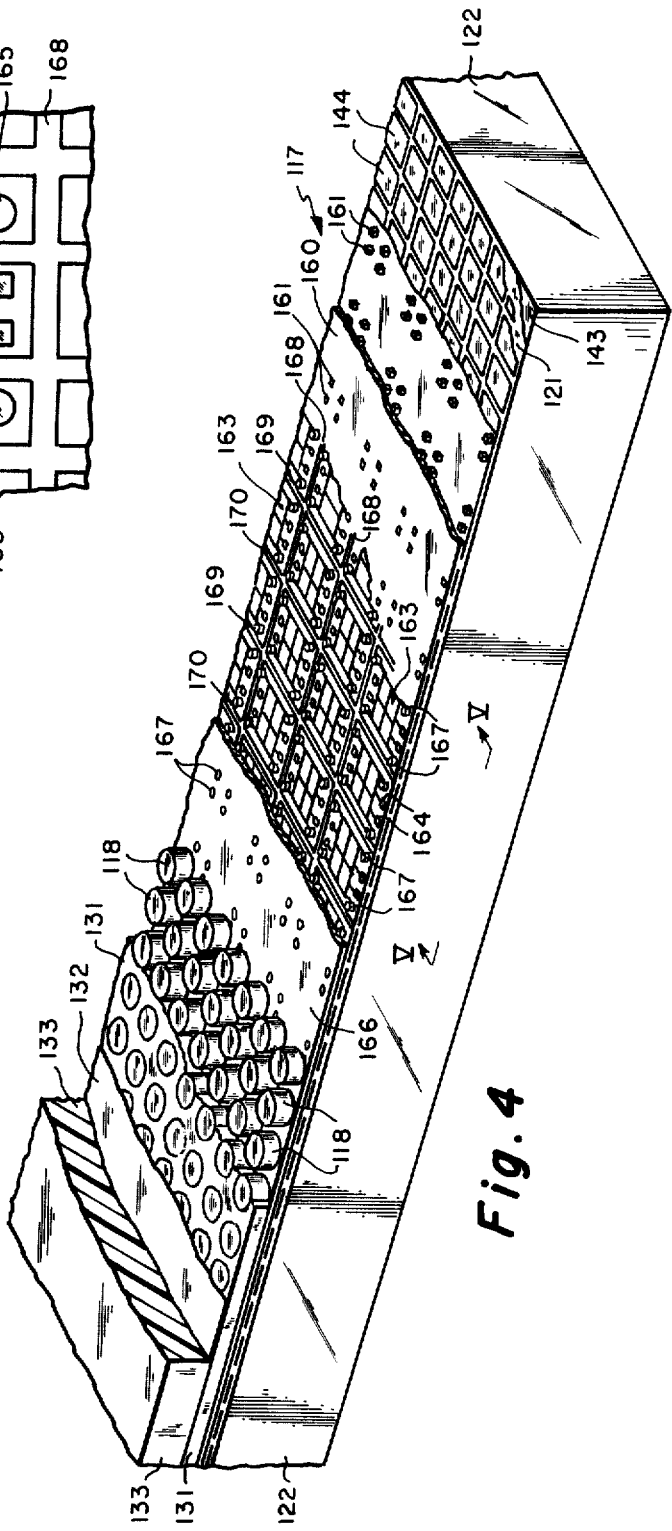
Figure 5:
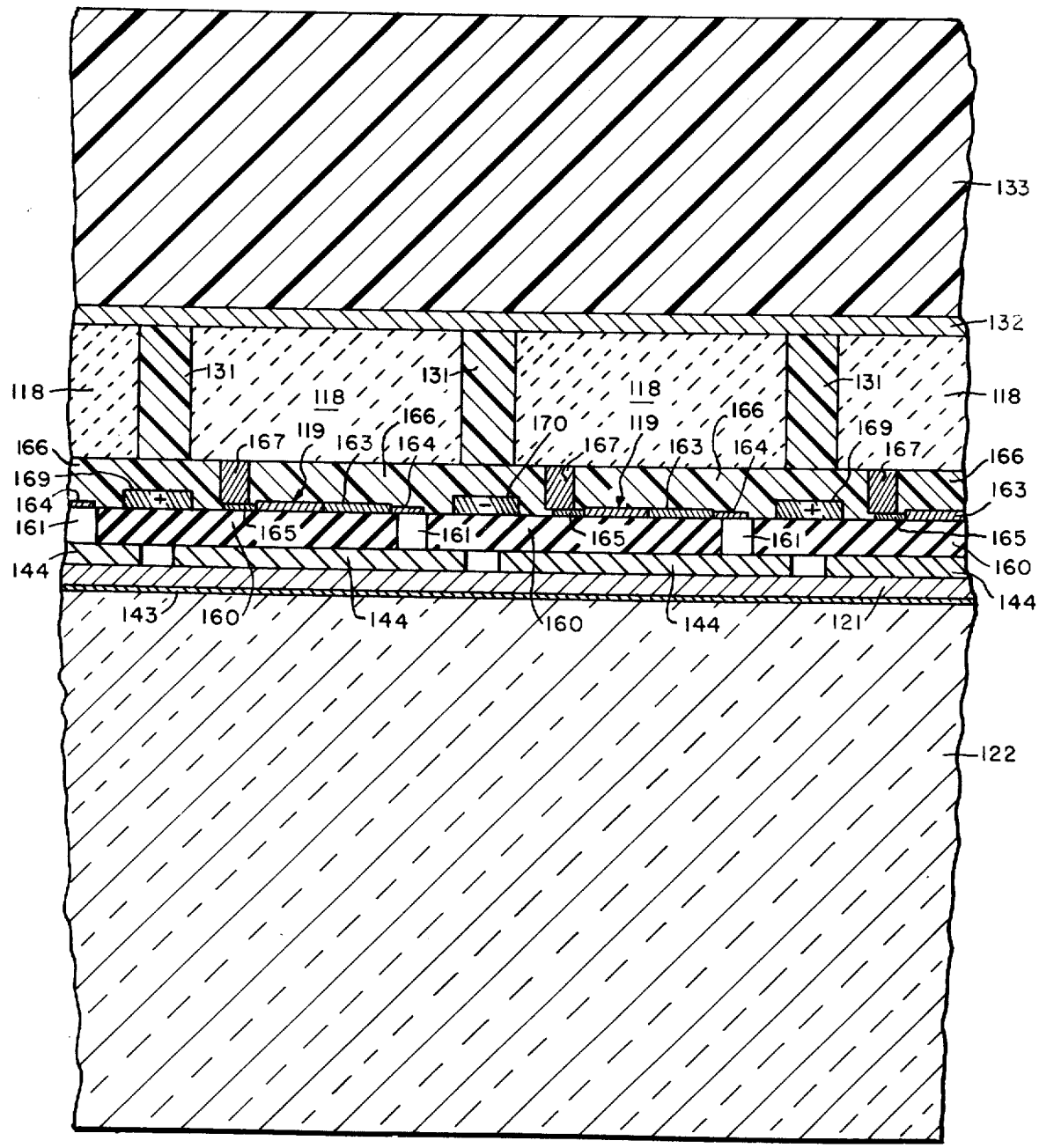
FIG. 5 is a section taken along line V—V of FIG. 4.

Referring to FIGS. 4 and 5 a preferred embodiment of the ultrasonic image converter is shown. In this embodiment a glass substrate 122 is preferably used with converter 117 to provide strength to the completed assembly. Substrate 122 is provided with a transparent conductive coating 143 of tin oxide (NESA) which is at ground potential. Deposited over conductive coating 143 is an electroluminescent layer 121 of phosphor. Evaporated through a mask onto layer 121 is an array of N aluminum conducting elements 144.

A first insulating layer 160 is positioned over conducting elements 144. Insulating layer 160 is provided with N first conducting members 161 extending therethrough and making contact with an associated conducting element. As can be seen from FIG. 4, first conducting members 161 are grouped in N/4 clusters of four members each.

Positioned over first insulating layer 160 is an array of N/4 areas 163 of semiconducting material such as silicon or gallium arsenide. Each area 163 is provided with four integrated circuit amplifiers 119(A-D), FIG. 4a. Each amplifier 119 is provided with an output terminal 164 in electrical contact with an associated first conducting member 161, and an input terminal 165.

A grid of conductive strips 168, 169, and 170 are evaporated onto insulating layer 160 to provide electrical power to amplifiers 119. Electrical strips 168 are at ground potentials and extend in each row between areas 163, and at right angle to strips 168 are strips 169 and 170 which are at a positive and negative D.C. voltage and each extend in alternate columns between areas 163, respectively. The intersection of the two orthogonal sets of conductive strip are insulated from each other, and to minimize feedback from the output terminal to the input terminal of each amplifier, a projective shield 171 is provided on each strip 168 between the input and output terminals.

Positioned over the conductive grid and semiconductor array is second insulating layer 166. Imbedded in second insulating layer 166 are N second conducting elements 167 in contact with an associated input terminal 165. In electrical contact with each associated second element 167 is piezoelectric transducer 118. The array of N transducers 118 is positioned by means of perforated sheet 131 made from allyl diglycol carbonate over which is positioned a thin conducting sheet 132, preferably of aluminum foil. A thin layer 133 of neoprene or the like is positioned over conductive layer 132 to protect converter 117 from an environment, such as water. Since this embodiment provides fabrication advantages over that shown in FIG. 2, it is preferred.

The operation of system 10, having a three colour display, may be more clearly understood by reference to the following illustrative example taken in connection with FIGS. 3a–c in which the horizontal axes represent time and the vertical axes represent voltage.

Every 1/60 of a second transmitter 12 transmits through transducer 11 a 3 μsec., 3 MHz pulse of sonic energy, FIG. 3a. Between the transmission of each pulse, reflected signals are received by converter 17 which represent a sonified area. During the period between transmission of the first and second pulses, pulse generator 13 provides first colour gating signals, FIG. 3b, to converter 17 as well as a range gate signal, FIG. 3c. Pulse generator 13 also provides a first signal to oscillator 14 to provide monitor 29 with a signal for a red display. Each first colour gating signal associated with the interval between the first and second pulses comprises the first 11 μsec. of every 33 μsec. period. Since in underwater sonar, for example, only selected range information is desired, only a selected portion of the reflected signal is converted for display. Thus, the range gate signal is used to select the desired or useful range.

Accordingly, sonic signals received by converter 17 from the first pulse are converted to an optical output only during the period when the range gate is open and during the first 11 μsec. of every 33 μsec. period. Thus, all sonic signals received in the first 11 μsec. of any 33 μsec. period in which the range gate is open are converted and displayed on monitor 29 in red.

In the 1/60 of a second between transmission of the second and third sonic pulses of transducer 11, pulse generator 13 provides second colour gate signals to converter 17. The pulse generator also provides the same range gate signal and a second signal to colour oscillator 14 for activating the green phase on monitor 29. The second colour gate signals comprise the second 11 μseconds of each 33 μsec. colour gate pulse period. All reflected sonic signals from the second transmitted pulse received by converter 17 during a second 11 μsec. period of a 33 μsec. period and during the time the range gate is open will be converted and displayed in monitor 29 in green. These signals will correspond to a range displacement of 11 μsec. from those received between the first and second pulses which were displayed in red.

In the 1/60 of a second between transmission of the third and fourth sonic pulses of transducer 11, pulse generator 13 provides third colour gate signals to converter 17. The pulse generator also provides a range gate signal, which is the same as those provided between the first and second and the second and third sonic pulses, and a third signal to colour oscillator 14 for activating the blue phase on monitor 29. The third colour gate signals comprise the third 11 μsec. period of each 33 μsec. colour gate pulse period. All sonic signals received by converter 17 during the third 11 μseconds of any 33 μsec. period in which the range gate is open are converted and displayed in blue. Subsequent pulse thereafter sequentially repeat the red, green, and blue colour gating and display.

The three colours are sequentially displayed during a period of 1/20 sec. (equal to three transmitted pulses). Since the human eye requires approximately 1/5 second to adjust to change, the picture displayed will appear to have three colours displayed simultaneously. Each colour will represent a different range. For example, range elements (signals as represented in distance from the system in units such as inches) 1, 4, 7 . . . are displayed in red, elements 2, 5, 8 . . . are displayed in green and elements 3, 6, 9 . . . are displayed in blue. By this method, exceptional definition can be achieved to distinguish reflected image patterns in a third dimension.

It is clear that while the presently described embodiments utilize field sequential colour, other methods are suitable. Other methods for achieving similar results will depend upon the type of colour monitor 29 used and/or the nature of the converter 17. A converter 17 can be provided having a tri-colour output, that is three sets of N piezoelectric transducers and associated output circuits each of which are sequentially gated and scanned by a colour television camera tube responsive to the selected colours.

Furthermore, it is clear that a black and white system may be used to achieve similar results. In such a case two colours would be used, white and gray. Every even range element would be defined as white and every odd element as gray. Absence of a signal would be displayed as black. In this case, the gate shown in FIG. 3b would provide that the gate be open the first 16.5 μsec. of each 33 μsec. period permitting white display from all odd range elements of a reflected signal from the first pulse. All even range element signals would be displayed from the second pulse by gating open switch 28 during the second 16.5 μsec. of each 33 μsec. Again, as with the colour display, white/gray signals can be sequenced during each pulse.

Moreover, while the description of the presently preferred embodiment was in terms of reflected sonic energy, it is clear that sonic image patterns or shadows can be directly focused on the image converter. This would be the case, for example, where an opaque material is inspected by transmitting ultrasonic energy therethrough for reception by the image converter.

Accordingly, while a presently preferred embodiment of the invention has been shown and described, it may otherwise be embodied within the scope of the appended claims.

What is claimed is:

1. A system for converting sonic energy patterns into optical images comprising:
   A. means for transmitting pulses of sonic energy to sonify an area;
   B. means for focusing any sonic energy reflected from said sonified area;
   C. means for converting said focused sonic energy to a visual image and comprising a unitized solid-state array including:
      a. a transparent supportive substrate;
      b. a transparent conductive film deposited on said substrate;
      c. a layer of electroluminescent material deposited on said film;
      d. an array of N spaced apart conductive pads deposited on said layer;
      e. an array of N spaced apart amplifiers, each of said amplifiers having a pair of electrical contact elements, one said pair being in electrical contact with an associated conductive pad, and each of said amplifiers having electrical connector means adapted for connection to a power source;
      f. an array of N spaced apart piezoelectric transducers, each of said transducers being in electrical contact with the other of said pair of electrical contact elements on an associated amplifier;
      g. a second electrical conductive film positioned over said array of transducers and in electrical contact therewith; and
      h. a low loss protective covering deposited over said second conductive film;
   D. lens means for focusing said optical output;
   E. a television camera tube positioned to receive all of said focused optical output and provide a video signal; and
   F. means electrically connected to said camera for visually displaying said video signals.

2. A system as set forth in claim 1 including a switching means electrically synchronized with said transmitting means connected to said converter means and a colour switching means for sequentially switching the colour of the displayed image to provide range information by means of colour hue.

3. A system as set forth in claim 2 including a colour oscillator which electrically changes the colour of the video display.

4. A system as set forth in claim 1 wherein said transmitting means includes a sonic transducer, a pulse generator and a pulse transmitter electrically connected to said transducer and said generator.

5. A sonic image converter comprising:
   a. a transparent supportive substrate;
   b. a transparent conductive film deposited on said substrate;
   c. a layer of electroluminescent material deposited on said film;
   d. an array of N spaced apart conductive pads deposited on said layer;
   e. an array of N spaced apart amplifiers, each of said amplifiers having a pair of electrical contact elements, one said pair being in electrical contact with an associated conductive pad, and each of said amplifiers having electrical connector means adapted for connection to a power source;
   f. an array of N spaced apart piezoelectric transducers, each of said transducers being in electrical contact with the other of said pair of electrical contact elements on an associated amplifier;
   g. a second electrical conductive film positioned over said array of transducers and in electrical contact therewith; and
   h. a low loss protective covering deposited over said second conductive film.

6. A sonic image converter of claim 5 wherein said array of amplifiers comprise $n$ rows, each of said rows having m equally spaced apart amplifier circuits (where $n \cdot m = N$) integrated therein, and $m$ pairs of electrical contact elements, one element of each pair mounted in the upper surface and said other element of each pair mounted in the lower surface, means for electrically connecting said pairs to an associated amplifier circuit, and means extending the length of each of said rows for electrically connecting said amplifiers to a source of electrical power.

7. A sonic image converter as set forth in claim 5 including a perforated acoustic absorbing material positioned between said second electrical conductive film and said amplifier array for positioning said array of piezoelectric transducers.

8. A sonic image converter as set forth in claim 6 wherein said amplifiers are integrated circuit amplifiers embedded within strips of insulating material.

9. An ultrasonic image converter comprising:
   a. a transparent supportive substrate;
   b. a transparent conductive film deposited on said substrate;
   c. a layer of electroluminescent material deposited on said film;
   d. an array of N spaced apart conductive pads deposited on said layer;
   e. a first insulating layer positioned over said array of conductive pads, said first insulating layer including N first conducting members extending therethrough and arranged in N/4 groups of four members each, each of said members making electrical contact with an associated conductive pad;

f. an array of N/4 semiconductive areas positioned over said first insulating layer, each of said semiconductive areas including four integrated circuit amplifiers, each of said amplifiers including an input and an output terminal, said output terminal making electrical contact with an associated first conductive member;

g. a conductive grid evaporated onto said first insulating layer and comprising a plurality of parallel ground potential electrodes extending in each row between said semiconductive areas and first and second electrodes positioned at right angles to said ground electrodes and each extending in alternate columns between each semiconductive area for providing electrical power to each amplifier, said orthogonal sets of strips being insulated from each other;

h. a second insulating layer positioned over said semiconductive areas and conductive grid, said second layer including N second conducting members extending therethrough and arranged in N/4 groups of four members each, each of said second members making electrical contact with an associated input terminal;

i. an array of N spaced apart piezoelectric transducers, each transducer making electrical contact with an associated second conducting member;

j. a second conductive film positioned over said array of transducers and in electrical contact therewith; and k. a low loss protective covering deposited over said second conductive film.

10. An ultrasonic image converter as set forth in claim 9 including a perforated acoustic absorbing material positioned between said second conductive film and said second insulating layer for positioning said array of piezoelectric transducers.

* * * * *